United States Patent
Yi

(10) Patent No.: US 10,225,269 B2
(45) Date of Patent: Mar. 5, 2019

(54) METHOD AND APPARATUS FOR DETECTING NETWORK ATTACKS AND GENERATING ATTACK SIGNATURES BASED ON SIGNATURE MERGING

(71) Applicant: ELECTRONICS AND TELECOMMUNICATIONS RESEARCH INSTITUTE, Daejeon (KR)

(72) Inventor: Sungwon Yi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 238 days.

(21) Appl. No.: 15/225,560

(22) Filed: Aug. 1, 2016

(65) Prior Publication Data

US 2017/0142136 A1  May 18, 2017

(30) Foreign Application Priority Data

Nov. 16, 2015  (KR) .......................... 10-2015-0160625

(51) Int. Cl.
  *H04L 29/06* (2006.01)
  *G06F 17/30* (2006.01)
(52) U.S. Cl.
  CPC .... *H04L 63/1416* (2013.01); *G06F 17/30312* (2013.01)
(58) Field of Classification Search
  CPC ............. H04L 63/1416; H04L 63/1408; H04L 63/1441; H04L 63/1458

(Continued)

(56) References Cited

U.S. PATENT DOCUMENTS 7,735,135 B1 *  6/2010  Zhou ................... H04L 63/1408
                                                            726/22
2005/0229254 A1  10/2005  Singh et al.

(Continued)

FOREIGN PATENT DOCUMENTS

KR  10-2009-0025953 A  3/2009
KR  10-2012-0048258 A  5/2012
WO  WO 2009/031744 A1  3/2009

OTHER PUBLICATIONS

James Newsome et al., "Polygraph: Automatically Generating Signatures for Polymorphic Worms", IEEE Symposium on Security and Privacy, May 8-11, 2005, pp. 226-241, IEEE.

(Continued)

*Primary Examiner* — Evans Desrosiers

(57) ABSTRACT

There are provided a method and an apparatus for detecting attacks and automatically generating attack signatures based on signature merging. A method for detecting attacks and automatically generating attack signatures based on signature merging includes detecting a character string matched to at least one previously stored compressed attack signature in an input packet received from a network, determining whether the character string detected in the primary attack detection is matched to at least one previously stored individual attack signature, and, if the detected character string is matched to the at least one previously stored individual attack signature, determining the input packet as an attack packet, and, if the detected character string is not matched, determining the input packet as a new attack signature.

13 Claims, 4 Drawing Sheets

(58) Field of Classification Search
USPC .......................................................... 726/23
See application file for complete search history.

(56) References Cited

U.S. PATENT DOCUMENTS

| | | |
|---|---|---|
| 2006/0123480 A1* | 6/2006 | Oh ..................... H04L 63/1408 726/23 |
| 2009/0260085 A1 | 10/2009 | Kim et al. |
| 2012/0114293 A1 | 5/2012 | Choe et al. |
| 2014/0183344 A1 | 7/2014 | Lee et al. |

OTHER PUBLICATIONS

Hao Chen et al., "Two-Stage Decomposition of SNORT Rules towards Efficient Hardware Implementation", International Workshop on Design of Reliable Communication Networks, Oct. 2009, pp. 1-8.

* cited by examiner

TREE-SHAPED SIGNATURE DB

INTERMEDIATE SIGNATURE DB

FINAL SIGNATURE DB

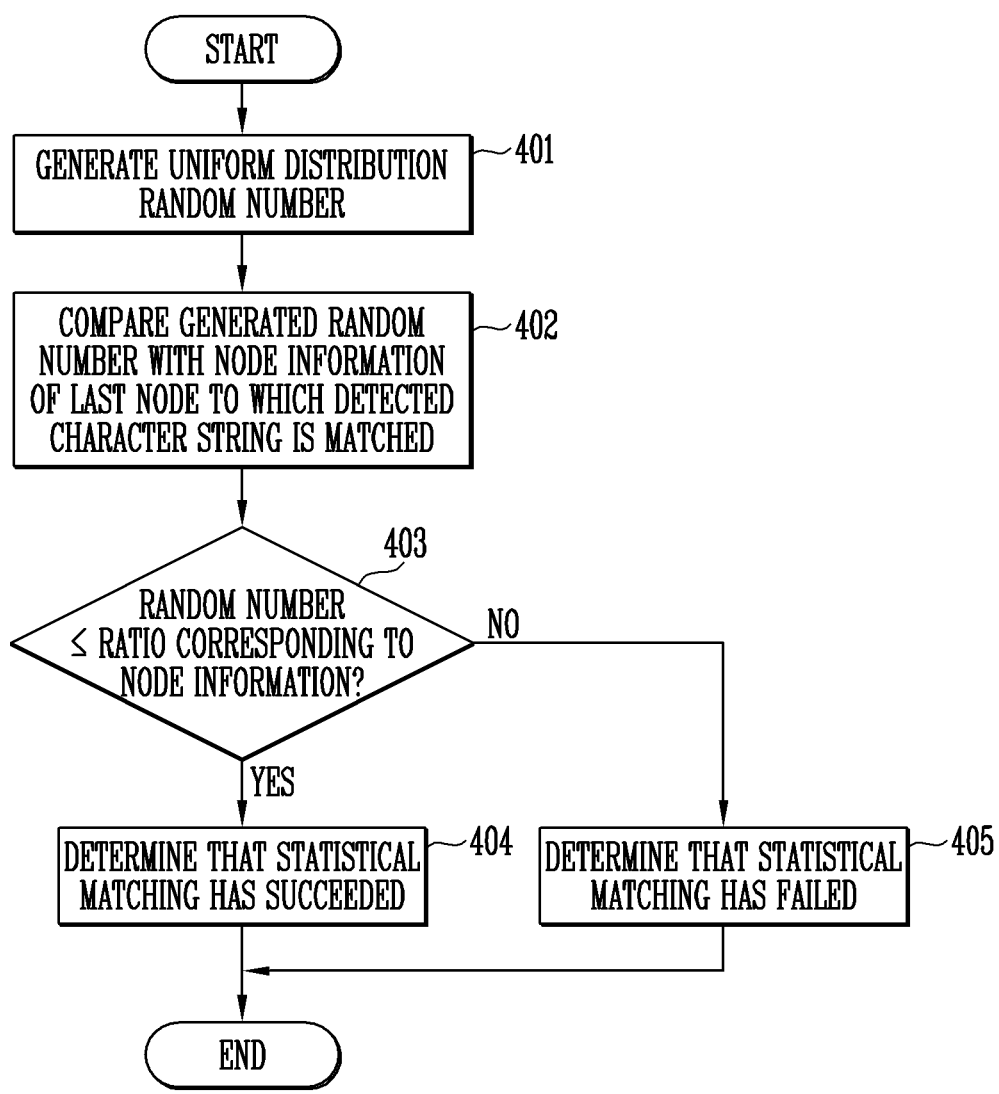

METHOD AND APPARATUS FOR DETECTING NETWORK ATTACKS AND GENERATING ATTACK SIGNATURES BASED ON SIGNATURE MERGING

CROSS-REFERENCE TO RELATED APPLICATION

The present application claims priority to Korean patent application number 10-2015-0160625 filed on Nov. 16, 2015, the entire disclosure of which is incorporated herein in its entirety by reference.

BACKGROUND

1. Field

An aspect of the present disclosure relates to a method and an apparatus for detecting network attacks and automatically generating attack signatures based on signature merging.

2. Description of the Related Art

Snort is one of the most frequently used signature based network intrusion detection techniques (snort.org). Snort manages an attack signature database and periodically updates the attack signature to cope with recently discovered attacks.

The number of attack signatures in Snort has increased gradually from 3997 in Snort version 2.1 to 31165 in Snort version 2.9. The Increment in attack signatures not only requires a large number of IPS memories but also increases the time required to detect attacks. Nevertheless, at least 6000 to 8000 attack signatures need to be generated to detect newly released malicious attacks every, and thus the size of the attack signature database is continuously growing. The growing size of the attack signature database delays a search speed and makes it difficult for the attack signature data base to be applied to a high-speed network in real time.

In order to solve this, Snort supports user configurable option to activate only subset of signature database: connectivity, balanced, and security. When Snort is in connectivity mode, only a small number of signatures become active and it can support a large traffic volume, whereas most of signatures are active when in security mode. Thus, a system delay is unavoidable when it is in security mode, and the misdetection of attacks is inevitable when it is in connectivity mode. Therefore, it is required to develop a network attack detection method for efficiently managing the increasing number of attack signatures.

Attack signatures should be generated in advance for an IPS detects all the known attacks. Signature generation techniques can be categorized by host-based and network-based techniques in general The network-based technique is a general method frequently used in generation of signatures. In the network-based technique, it is assumed that there is a unique byte sequence in a malicious attack traffic, which is necessarily required to attack a target network. Accordingly, traffic (session) exhibiting a suspicious feature is separated from network traffic, and a common character string is extracted from the separated traffic to be generated as an attack signature in the network-based technique. However, an attacker can easily circumvent the detection mechanism of the network based signature generation techniques by inducing a meaningless arbitrary character string into an attack traffic and can be used as false attack signatures.

In host-based techniques, network traffics are induced to a controlled environment and an abnormal code is detected in an execution process. In host-based technique, an attack signature may be generated only after the target systems are damage, and it takes a long time until the signature generation. This is because a signature should be carefully tested not to harm a normal traffic. To this end, a separate apparatus different from the IPS for testing the signature candidate is required.

In signature-based network security techniques, a technique for generating attack signatures and an IPS technique for detecting signature-based attacks are implemented in separated devices. Therefore, separate systems and transmission devices are required to generate attack signatures and apply them for IPS, and a delay is also inevitable in these processes.

SUMMARY

Embodiments provide a method and an apparatus for detecting network attacks and generating attack signatures based on a signature merging technique, which can efficiently decrease the size of an attack signature database and a two-step attack detection techniques where statistical matching is used to increase the detection accuracy.

Embodiments also provide a method and an apparatus for detecting network attacks and generating attack signatures based on signature merging, in which, at the same time when attacks are detected, attack signatures are generated in real time, based on the detected attacks.

According to an aspect of the present disclosure, there is provided a method for detecting network attacks and generating attack signatures based on signature merging, the method including: detecting a character string from an input packet matched to at least one previously stored compressed attack signature; determining whether the character string detected in the primary attack detection is matched to at least one previously stored individual attack signature; and, if the detected character string is matched to the at least one previously stored individual attack signature, determining the input packet as an attack packet, and, if the detected character string is not matched, determining the input packet as a new attack signature.

According to an aspect of the present disclosure, there is provided an apparatus for detecting network attacks and generating attack signatures based on signature merging, the apparatus including: a communication unit configured to receive an input packet from a network; a storage unit configured to include a detailed database for storing at least one individual attack signature and a compressed database for storing at least one compressed attack signature generated by compressing the individual attack signature according to a preset algorithm; and a control unit configured to, if a character string matched to the compressed database is detected in the input packet, compare the detected character string with the detailed database, if the detected character string is matched to the detailed database, determine the input packet as an attack packet, and, if the not, generate the input string as a new attack signature.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 4 is a flowchart illustrating a method for performing statistical matching according to an embodiment of the present disclosure.

DETAILED DESCRIPTION

The present disclosure now will be described more fully hereinafter with reference to the accompanying drawings, in which embodiments of the present disclosure are shown. The present disclosure should not be construed as limited to the embodiments set forth herein. Rather, these embodiments are provided so that this disclosure will be thorough and complete, and will fully convey the scope of the present disclosure to those skilled in the art.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof.

As used herein, the singular forms are intended to include the plural forms as well, unless the context clearly indicates otherwise.

Hereinafter, exemplary embodiments of the present disclosure will be described in detail with reference to the accompanying drawings.

Figure 1:
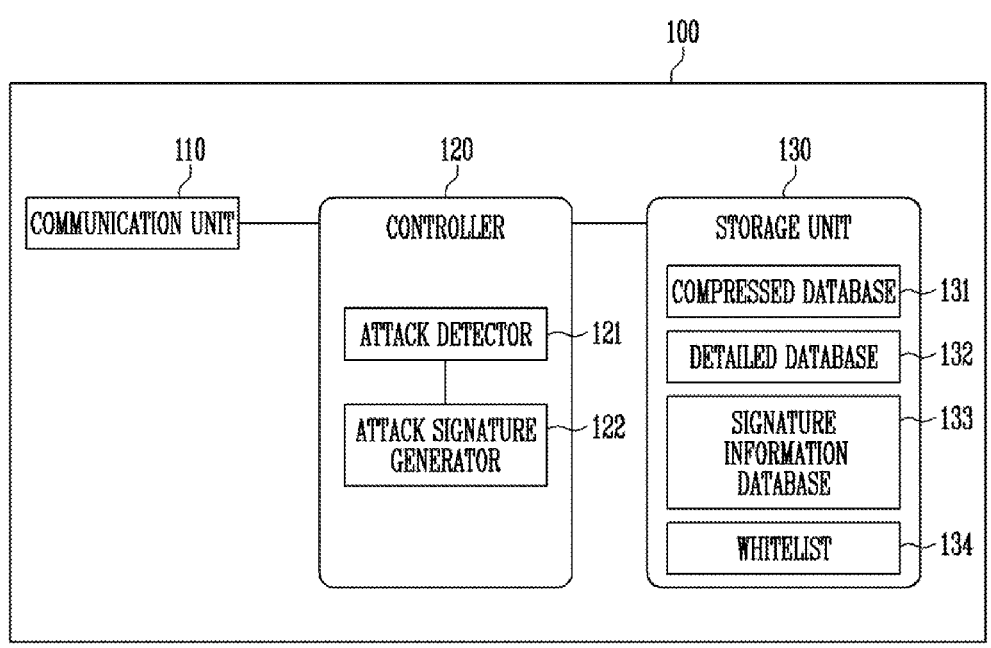
FIG. 1 is a block diagram illustrating a structure of an apparatus for detecting attacks and generating attack signatures according to an embodiment of the present disclosure.

FIG. 1 is a block diagram illustrating a structure of an apparatus for detecting attacks and generating attack signatures according to an embodiment of the present disclosure.

Referring to FIG. 1, the apparatus 100 according to the embodiment of the present disclosure may include a communication unit 110, a controller 120, and a storage unit 130.

The communication unit 110 receives a network packet stream and transmits the received network packet stream to the controller 120. The network packet stream may include a character string forming data included in each packet.

The controller 120 controls each component of the apparatus 100 so as to detect attacks in the network packet stream received through the communication unit 110.

In the embodiment of the present disclosure, the controller 120 includes an attack detector 121 and an attack signature generator 122. Accordingly, the controller 120 can detect network attacks through the attack detector 121 and, simultaneously, can form a signature database based on the detected attacks through the attack signature generator 122.

The attack detector 121 detects attacks in an input network packet stream, using a signature database stored in the storage unit 130. In the embodiment of the present disclosure, the attack detector 121, as primary attack detection, may compare an input character string with a compressed database 131. When a character string matches in the compressed database 131, the attack detector 121, as secondary attack detection, may compare the detected character string with a detailed database 132. The primary attack detection functions to filter a target for the secondary attack detection, and the character string detected in the primary attack detection may be used to generate attack signatures in the attack signature generator 122.

In various embodiments, the attack detector 121 may perform signature information matching after the primary attack detection. The attack detector 121 compares the character string detected in the primary attack detection with a signature information database 133 stored in the storage unit 130. When signature information corresponding to the detected character string is searched in the signature information database 133, the attack detector 121 may perform the secondary attack detection. When the corresponding signature information is not searched, the attack detector 121 may perform statistical matching. In an embodiment, the attack detector 121 may perform statistical matching when the length of the detected character string is equal to or greater than a preset threshold value.

The attack detector 121 may generate a uniform distribution random number and then compare the generated random number with node information of the last node, to which the detected character string is matched. If a ratio corresponding to the node information is greater than or equal to the generated random number, the attack detector 121 may determine that the statistical matching has succeeded. Here, the ratio corresponding to the node information may be a ratio of the number of attack signatures ended at the corresponding node and the number of signatures passing through the corresponding node. If it is determined that the statistical matching has succeeded, the attack detector 121 may transmit the detected character string to the attack signature generator 122 such that the corresponding character string can be generated as an attack signature.

When the character string detected in the primary attack detection is not matched in the secondary attack detection, the attack detector 121 may transmit the character string detected in the primary attack detection to the attack signature generator 122 such that the corresponding character string can be generated as an attack signature.

The attack signature generator 122 may store, in the detailed database 132, the character string as an attack signature, which is detected by the attack detector 121 through the primary attack detection. The attack signature generator 122 may generate a compressed attack signature from the detected character string and store the compressed attack signature in the compressed database 131.

In various embodiments, the attack signature generator 122 may use a grammar inference technique so as to generate compressed attack signatures. The grammar inference technique is a technique in which all attack signatures are not stored, and only a small amount of data is managed by inferring a rule (grammar) for generating attack signatures, thereby efficiently detecting attack signatures. This will be described in detail as follows.

Figure 2A:
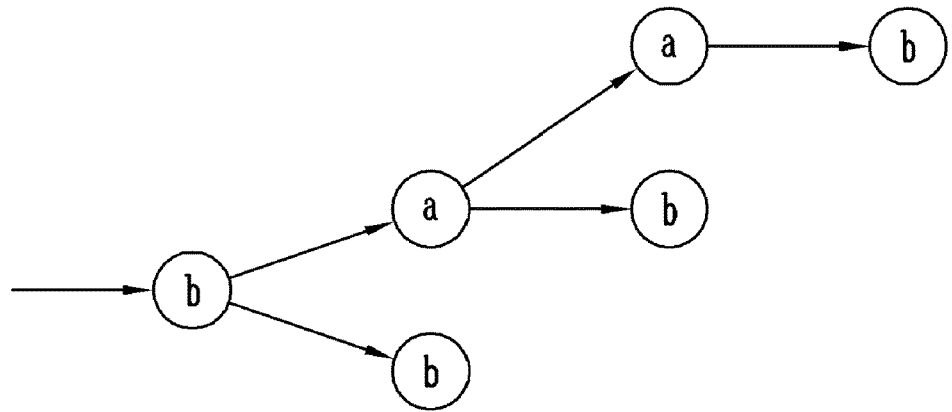
FIGS. 2A to 2C are diagrams illustrating a method for generating a compressed database according to an embodiment of the present disclosure.
Figure 2B:
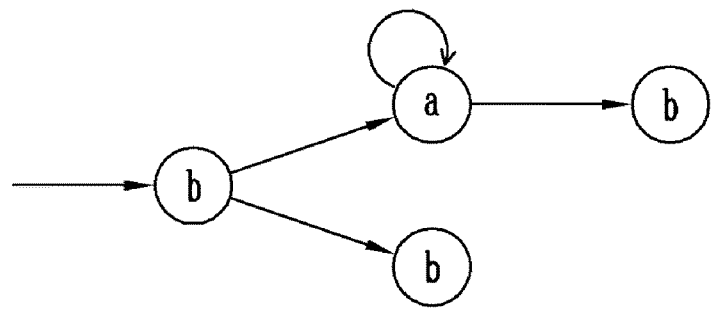
Figure 2C:
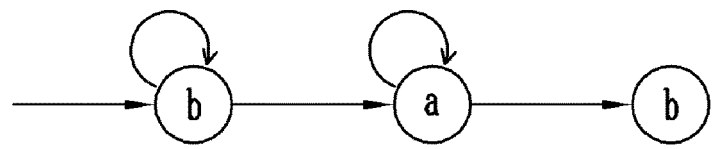

In an embodiment, when attack signatures called as baab, bab, and bb are generated, the attack signatures may be formed in a tree shape as shown in FIG. 2A. If the grammar inference technique (e.g., Alergia, KDM) is applied herein, nodes of FIG. 2A may be compressed as shown in FIG. 2C via FIG. 2B through state merging. The attack signature generator 122 may generate compressed attack signatures according to the grammar inference technique and store the compressed attack signatures in the compressed database 131.

However, if the grammar inference technique is applied to generate compressed attack signatures, the following problems may occur in the detection of attacks. First, since the grammar is more general than respective attack signatures, a packet that is not an attack may be erroneously detected as an attack packet. For example, in the embodiment of FIGS. 2A to 2C, bbab is not an attack signature but matched to the compressed signature of FIG. 2C. In addition, unlike a character string having clear start and end characters, a character string of a network packet stream has unclear start and end characters. Hence, when the grammar inference technique is applied as it is, it is difficult to specify a detection time.

In the present disclosure, in order to solve the problems, the secondary attack detection is performed as described above, and the signature information database 133 and the statistical matching are additionally used.

In various embodiments, the attack signature generator 122 may store, as node information on each node of the compressed database 131, information on a ratio of the number of attack signatures ended at the corresponding node and the number of signatures passing through the corresponding node. Also, the attack signature generator 122 may generate, as signature information on a generated attack signature, information on the length of the attack signature and the last character of the attack signature, and store the generated information in the signature information database 133.

In the present disclosure, data and a system, which are used to generate attack signatures, are separated from an attacker. Thus, the apparatus according to the present disclosure is fundamentally safe from bypassing techniques of attackers.

The storage unit 130 may store an attack signature generated by the attack signature generator 122 in the compressed database 131 and the detailed database 132.

The compressed database 131 may store the compressed attack signature generated by the attack signature generator 122 in a tree-shaped structure shown in FIG. 2C. In this case, the compressed database 131 may include node information on each node, and the node information may include information on a ratio of the number of attack signature ended at the corresponding node and the number of signatures passing through the corresponding node.

The detailed database 132 may include generated malicious signatures as they are, or may store the generated malicious signatures in a tree-shaped structure shown in FIG. 2A.

In various embodiments, the detailed database 132 may be combined with newly generated attack signatures to be periodically compressed, thereby forming the compressed database 131. In this case, the detailed database 132 may be compressed using the grammar inference technique.

The storage unit 130 may store the signature information database 133. The signature information database 133 may include, as signature information, information on the lengths of stored attack signatures and the last characters. In the embodiment of FIGS. 2A to 2C, the signature information on the attack signatures baab, bab, and bb may be 2:b, 3:b, and 4:b, respectively.

Additionally, the storage unit 130 may store a whitelist 134. The whitelist 134 may be configured based on a character string that was detected as a matched character string in an attack detection process but is finally determined that the character string is not an attack. For example, the whitelist 134 may be generated based on a character string that was matched in the primary attack detection and the signature information but is not matched in the statistical matching. The whitelist 134 may be used as information for performing exception processing on a corresponding character string in attack detection.

Hereinafter, a method for detecting attacks and generating attack signatures in the apparatus 100 according to the present disclosure will be described in detail.

Figure 3:
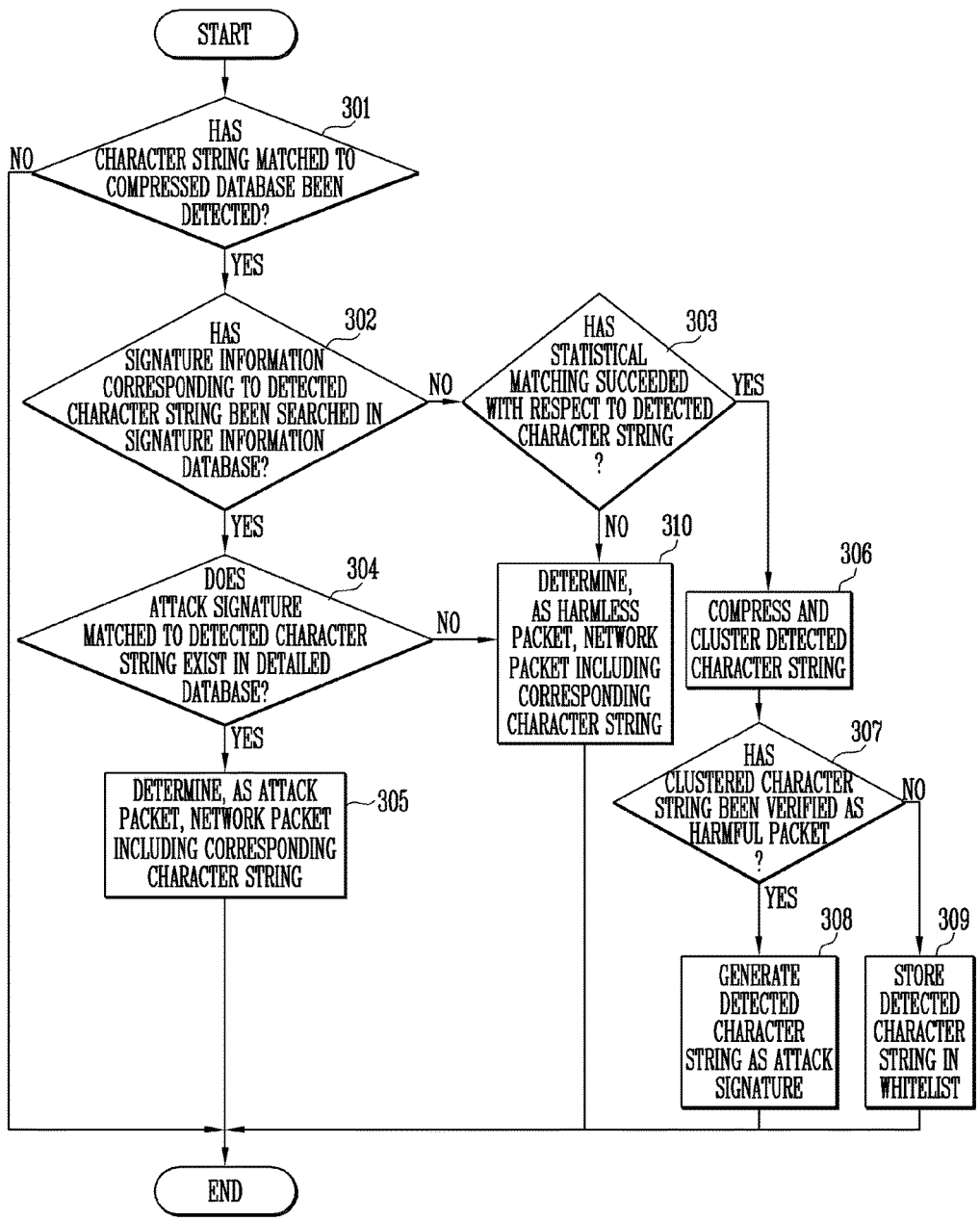
FIG. 3 is a flowchart illustrating a method for detecting attacks and generating attack signatures according to an embodiment of the present disclosure.

FIG. 3 is a flowchart illustrating a method for detecting attacks and generating attack signatures according to an embodiment of the present disclosure.

Referring to FIG. 3, first, the apparatus 100 determines whether a character string in an input stream, which is matched to the compressed database 131, has been detected (301). The apparatus 100, as primary attack detection, compares a payload portion of an input network packet with compressed attack signatures stored in the compressed database 131. The apparatus 100 detects whether a compressed attack signature matched to the compressed attack signature stored in the compressed database 131 exists in a character string included in the network packet.

If a matched character string is detected, the apparatus 100 determines whether signature information corresponding to the detected character string has been searched in the signature information database 133 (302). The apparatus 100 searches, in the signature information database 133, signature information corresponding to the length of the detected character string and the last character of the detected character string.

If any signature information is not searched, the apparatus 100 determines whether statistical matching has succeeded with respect to the detected character string (303). In an embodiment, the apparatus 100 may first determine whether the length of the detected character string is equal to or greater than a preset threshold value. When the length of the detected character string is equal to or greater than the preset threshold value, the apparatus 100 may determine whether the statistical matching has succeeded. A method for performing the statistical matching will be described in detail with reference to FIG. 4.

Meanwhile, if the signature information is searched, the apparatus 100 determines whether an attack signature matched to the detected character string exists in the detailed database 132 (304). The apparatus 100, as secondary attack detection, compares the character string detected in the primary attack detection with attack signatures stored in the detailed database 132. The apparatus 100 detects whether an attack signature matched to the character string detected in the compressed database 131 exists in the detected character string.

If an attack signature matched to the detected character string exists, the apparatus 100 determines, as an attack packet, a network packet including the corresponding character string (305).

If the statistical matching succeeds in the determining of whether the statistical matching has succeeded, the apparatus 100 compresses and clusters the detected character string (306). The apparatus 100 merges and compresses overlapping characters in the detected character string. As repeated characters are compressed as one, the apparatus 100 can detect an attack signature variant that may be generated. Also, the apparatus 100 clusters the compressed character string with character strings having the same components. For example, character strings acb and abc have the same components, and therefore, the apparatus 100 assigns the corresponding character strings to the same cluster.

After that, the apparatus 100 verifies whether the clustered character string is a harmful packet (307). If the corresponding character string is a harmful packet as the verification result, the apparatus 100 generates the detected character string as an attack signature (308). The apparatus 100 may store the generated attack signature in the detailed database 132. Also, the apparatus 100 may compress the generated attack signature and store the compressed attack signature in the compressed database 131. In this case, the apparatus 100 may update node information for each node of the compressed database 131. Also, the apparatus 100 may update the signature information database 133, using information on the length of the generated attack signature and information on the last character of the generated attack signature.

The above-described method according to the present disclosure is not a network-based or host-based method but a database-based method, and can prevent, in advance, an attacker's intervention in the generation of an attack signature.

On the other hand, if the corresponding character string is a harmless packet as the verification result, the apparatus 100 may store the detected character string in the whitelist 134 (309).

Meanwhile, when the statistical matching does not succeed in the determining of whether the statistical matching has succeeded or when any attack signature matched in the secondary attack detection is not searched, the apparatus 100 determines, as a harmless packet, a network packet including the corresponding character string (310).

FIG. 4 is a flowchart illustrating a method for performing the statistical matching according to an embodiment of the present disclosure.

Referring to FIG. 4, in order to perform the statistical matching, the apparatus 100 first generates a uniform distribution random number (401).

After that, the apparatus 100 compares the generated random number with node information of the last node to which the detected character string is matched (402). The node information may be a ratio of the number of attack signatures ended at the corresponding node and the number of signatures passing through the corresponding node.

If the ratio corresponding to the node information is greater than or equal to the generated random number as a result obtained by comparing the random number with the ratio corresponding to the node information (403), the apparatus 100 may determine that the statistical matching has succeeded (404).

On the other hand, if the ratio corresponding to the node information is smaller than the random number, the apparatus 100 may determined that the statistical matching has failed (405).

In the method and the apparatus according to the present disclosure, the detection of attacks and the generation of attack signatures can be performed in the same process.

Also, in the method and the apparatus according to the present disclosure, it is possible to solve the problems that resources for the attack signature database are restricted and that the speed in the detection of attacks is decreased.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A method for detecting network attacks and generating attack signatures based on signature merging, the method comprising:
   a primary attack detection step of detecting a character string matched to at least one previously stored compressed attack signature in an input packet received from a network;
   a secondary attack detection step of determining whether the character string detected in the primary attack detection is matched to at least one previously stored individual attack signature; and
   a step of, if the detected character string is matched to the at least one previously stored individual attack signature, determining the input packet as an attack packet, and, if the detected character string is not matched, determining the input packet as a new attack signature,
   wherein the at least one compressed attack signature is generated by compressing the at least one individual attack signature according to a preset algorithm, and
   wherein the primary attack detection step includes:
   performing statistical matching on the basis of the detected character string based on whether signature information corresponding to the detected character string has been searched;
   if the statistical matching is successful, merging and compressing overlapping characters of the detected character string, clustering at least one compressed character string, and verifying the at least one clustered character string; and
   generating the detected character strings as a new attack signature based on the whether the input packet is a harmful packet as the verification result.

2. The method of claim 1, wherein the at least one individual attack signature is previously stored, in a detailed database, in a tree shape having, as a node, at least one character constituting the at least one individual attack signature, and
   the at least one compressed attack signature is previously stored, in a compressed database, in a tree shape formed by merging consecutive characters in the node.

3. The method of claim 2, wherein the primary attack detection step includes:
   determining whether the signature information corresponding to the detected character string has been searched in a previously stored signature information database; and
   if the signature information is searched, the secondary attack detection step is performed.

4. The method of claim 3, wherein the signature information includes combination of the length of the at least one individual attack signature and the last character of the at least one individual attack signature.

5. The method of claim 2, wherein the primary attack detection step further includes:
- if the signature information is not searched, performing statistical matching on the basis of the detected character string and node information previously stored for each node of the compressed database; and
- if the statistical matching succeeds, generating an individual attack signature on the basis of the detected character string.

6. The method of claim 5, wherein the performing of the statistical matching includes, if the length of the detected character string is equal to or greater than a preset threshold value, performing the statistical matching.

7. The method of claim 5, wherein the performing of the statistical matching includes:
- generating a uniform distribution random number; and
- if a ratio of the number of attack signatures ended at the corresponding node included in the node information and the number of signatures passing through the corresponding node is greater than or equal to the uniform distribution random number, determining that the statistical matching has succeeded.

8. An apparatus for detecting network attacks and generating attack signatures based on signature merging, the apparatus comprising:
- one or more processors that process computer executable program code embodied in non-transitory computer readable storage media,
- the computer executable program code to:
- receive an input packet from a network;
- store a detailed database for storing at least one individual attack signature and a compressed database for storing at least one compressed attack signature generated by compressing the individual attack signature according to a preset algorithm;
- if a character string matched to the compressed database is detected in the input packet, compare the detected character string with the detailed database, if the detected character string is matched to the detailed database, determine the input packet as an attack packet, and, if the detected character string is not matched, generate the input packet as a new attack signature; and
- store a signature information database including a combination of the length of the at least one individual attack signature and the last character of the at least one individual attack signature.

9. The apparatus of claim 8, wherein the detailed database is configured in a tree shape having, as a node, at least one character constituting the at least one individual attack signature, and
- the compressed database is configured by merging consecutive characters in the node.

10. The apparatus of claim 9,
- wherein the computer executable program code is executed to compare the detected character string with the detailed database if signature information corresponding to the detected character string is searched in the signature information database.

11. The apparatus of claim 10, wherein the compressed database includes node information including a ratio of the number of attack signatures ended at the corresponding node and the number of signatures passing through the corresponding node, and
- the computer executable program code is executed:
- if the signature information is not searched, to perform statistical matching on the basis of the detected character string and the node information, and
- if the statistical matching succeeds, to generates an individual attack signature and a compressed attack signature on the basis of the detected character string.

12. The apparatus of claim 11, wherein the computer executable program code is executed,
- if the length of the detected character string is equal to or greater than a preset threshold value, to generate a uniform distribution random number, and
- if the ratio included in the node information is greater than or equal to the uniform distribution random number, to determines that the statistical matching has succeeded.

13. The apparatus of claim 11, wherein the computer executable program code is executed to store a whitelist including at least one characteristic string on which exception processing is performed in attack detection, and
- the computer executable program code is further executed
- if the statistical matching fails, to determines the input packet as a harmless packet,
- if the statistical matching succeeds, to merge and compress overlapping characters of a detected character string, cluster at least one compressed character string, and verify the clustered character strings,
- if the input packet is a harmful packet as the verification result, to generate the detected character string as a new attack signature, and
- if the input packet is a harmless packet as the verification result, to store the detected character string in the whitelist.

* * * * *